United States Patent [19]

Knoll

[11] 4,275,506
[45] Jun. 30, 1981

[54] APPARATUS AND METHOD FOR PATTERNING GEOMETRIC OBJECTS

[76] Inventor: Francis Knoll, 2070 Rosemary, Denver, Colo. 80207

[21] Appl. No.: 98,671

[22] Filed: Nov. 29, 1979

[51] Int. Cl.³ .............................................. G01B 5/20
[52] U.S. Cl. ...................................................... 33/175
[58] Field of Search ................... 33/174 G, 174 P, 175

[56] References Cited

U.S. PATENT DOCUMENTS

| 365,873 | 7/1887 | Spence et al. | 33/175 |
| 1,012,372 | 12/1911 | Landenberger | 33/175 |
| 1,465,646 | 8/1923 | Lough | 33/175 |

FOREIGN PATENT DOCUMENTS

Ad.25819 of 1912 United Kingdom ....................... 33/175

*Primary Examiner*—Harry N. Haroian
*Attorney, Agent, or Firm*—Gregg I. Anderson

[57] ABSTRACT

A planar pattern making device that fits around a patterned object retaining an indication of the patterned object's surface within the plane of the pattern making device. A pair of opposed symmetric hinged arms are sized so that when closed around the object, they roughly fit the object to be patterned. A plurality of pins reciprocate inwardly from both arms to contact the surface of the object to be patterned. According to the method of the invention, the pattern making device is then latched and the pins are reciprocated to contact the surface of the object to be patterned in a predetermined plane. The arms are released, retaining the indication of the patterned object's contour through the pins. Relatching of the arms in a set position on a planar surface from which the pattern is to be cut, allows a user to trace around the innermost position of all pins and thereby draw a pattern that when cut out will follow the contour of the patterned object at the level and in the plane in which the pattern was made.

3 Claims, 10 Drawing Figures

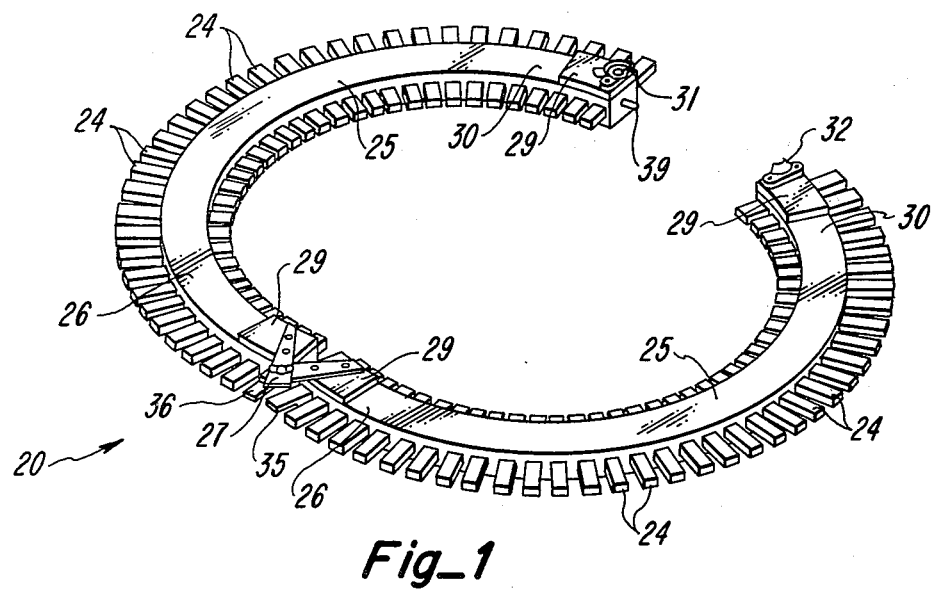
Fig_1
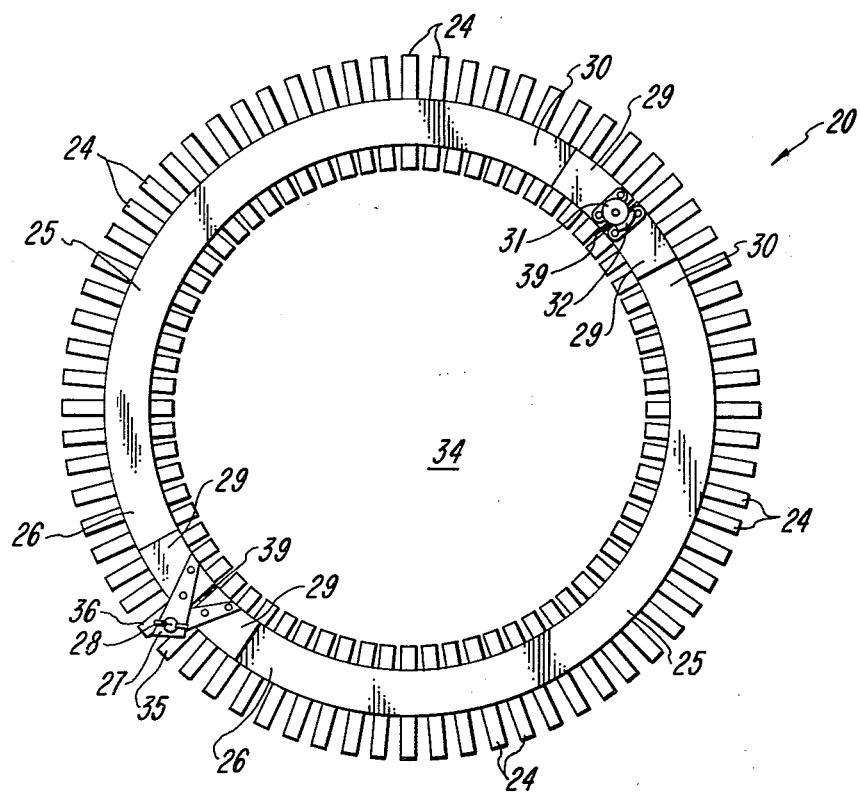
Fig_2

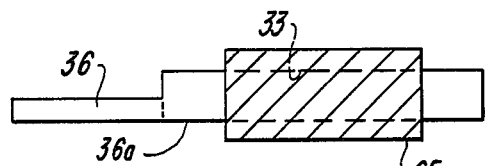
Fig_3
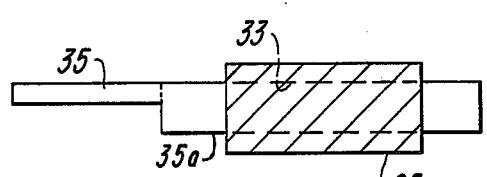
Fig_4
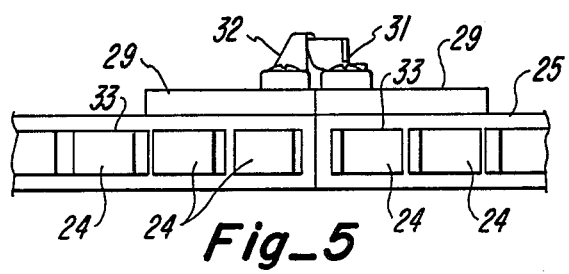
Fig_5
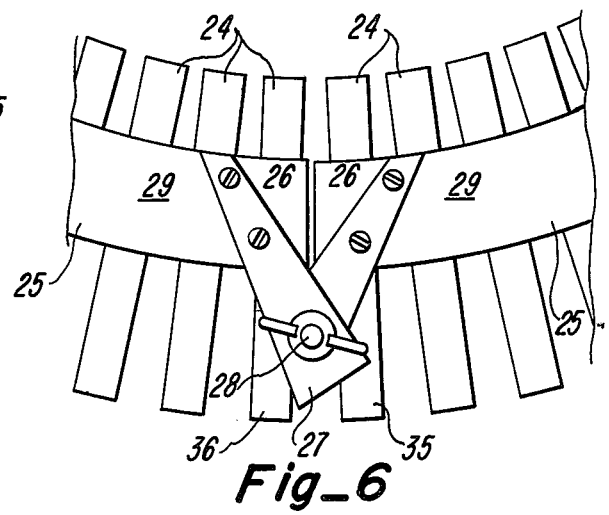
Fig_6
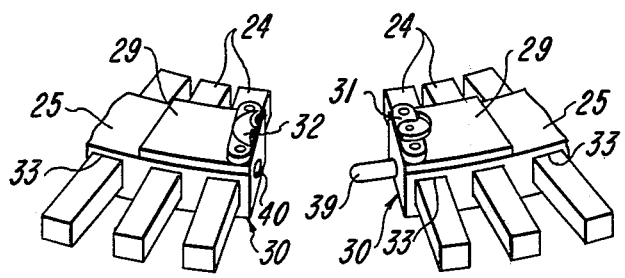
Fig_7
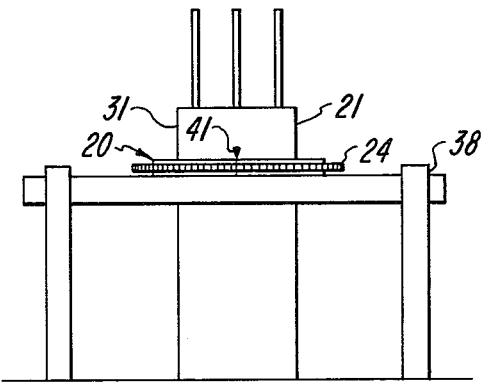
Fig_8
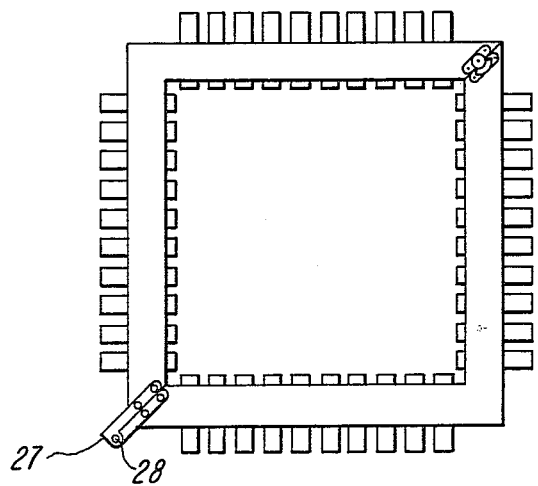
Fig_10
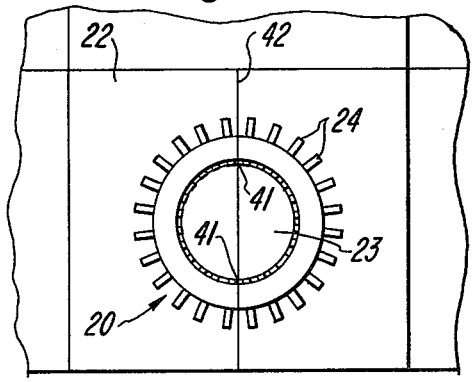
Fig_9

APPARATUS AND METHOD FOR PATTERNING GEOMETRIC OBJECTS

BACKGROUND OF THE INVENTION

1. Field of the Invention

This invention relates to pattern making devices for objects of geometric cross-section and more particularly pattern making devices of the type that can trace all variations of contour an object may have within a given plane.

2. Description of the Prior Art

The pattern making device of the present invention, and the method of using same, are particularly well suited for use in the construction industry, particularly in the construction of concrete buildings or parking garages utilizing poured concrete columns. Once a concrete column has been poured, a concrete floor is poured around the top of it. A form that patterns the concrete column must be placed around the column so that when the concrete floor is poured, seepage of concrete around the column and onto the area below is minimized.

Concrete columns poured during construction of these buildings and parking ramps are of a specified size. However, custom cutting of a pattern in the plywood that will ultimately fit around the column is required because of the manner in which the concrete hardens or sets. Variations in the moisture content of the concrete mix and the loading due to the weight of the column cause bulges and variations around the circumference of the column in any given plane.

Current construction methods are based on trial and error. First, a circle of near the optimum diameter of the column is cut from a piece of plywood. One man then sets the polywood over the column and another traces the areas that need to be cut away, observing and marking from underneath the plywood. Once the second man has traced a pattern on the underneath surface of the plywood, the plywood is removed from over the column and a second cut is made. This process is repeated until the hole that is cut is patterned to fit the surface of the concrete column.

The pattern cut out from the plywood by using the above method is seldom exact. Concrete can seep between the column and the plywood. Certain jobs make concrete seepage around the columns contrary to the specification.

Additional obvious drawbacks to the present method of making these patterns is the time involved in doing so. At least two cuts are required and at least two men are required.

Pattern making devices utilizing sliding pins to describe a contoured surface are commercially available. These devices are longitudinal structures only, having no provision for circumscribing the plane of an object of a geometric transverse cross-section. The longitudinal devices are currently used by woodworkers and furniture makers. A precise pattern of a curvilinear surface can be retained by the device and transferred to the surface of another piece of wood. Tracing the retained contour onto the surface of a piece of wood and cutting along the line traced results in a pattern that can be used to cut an identical curvilinear piece of wood.

Adaption of a pattern making device of the type previously known in longitudinal form only to the pouring of concrete columns is impractical. Several distinct patterns would have to be retained, the wooden surface from which the pattern would be cut would have to be very precisely marked and a tracing of a portion of the object transferred to the wooden surface from the pattern making device. The process would have to be repeated until the entire perimeter of the geometric object was circumnavigated.

To attempt to do this is not only time consuming but in all probability cannot accurately be done by a carpenter on the job. The prior art devices are therefore unacceptable when the perimeter of a circular or a square cross sectional object is to be patterned.

OBJECTS AND SUMMARY OF THE INVENTION

The principal object of the invention is to provide an apparatus that can make a pattern from the contour of a geometric cross sectioned object, and retain in indication of the contour so that later the pattern of the contour can be transferred to a surface from which the pattern will be cut out to ultimately fit around the patterned object.

A related object of the invention is to teach a quick and efficient method of using the pattern making device to arrive at a pattern for a contour of a geometric object that is patterned.

A further object of the present invention is to make a pattern of the contour of geometric objects which can then be transferred to a given surface.

In accordance with the objects of the invention pattern making device comprises a pair of opposed arms connected by a hinge at one end and pivotable to a closed position defining a closed figure. An open space is thereby defined between the arms which roughly conforms to the geometric cross section which is to be patterned so that ultimately a contour can be fitted around the patterned object. A latching mechanism is disposed at the end opposite the hinge to join the arms. In an embodiment for a pattern making device for objects of circular geometric cross section, the pattern making device has at equal incremental arcs around the circumference of the pattern making device inwardly extending radial pins which are reciprocally mounted to both arms. These pins are adapted to then be pushed against the surface of the object. During this procedure, the entire pattern making device is supported by scaffolding or other means at the level at which the contour is to be made.

The method of the present invention involves extending all the pins along their paths of travels, while the pattern making device is supported at the desired level, and after the ends of the arms have been latched. The hinged end and the latched end of the pattern making device define index points, a line between the index points defining further a reference line. With the arms latched around the object to be patterned, the pins extended to contact the surface and the entire pattern making device supported at the desired level on the object to be patterned, a mark, or index point, is made on the object to be patterned at the hinged end and lateral end of the pattern making device.

The pattern making device is unlatched, preserving the position of the pins, and then relatched. The planar surface from which the contour is to be made is marked with a reference line that is either arbitrary or constructed from measurements made from adjacent wooden surfaces to the index marks made on the patterned object.

The ends on the relatched pattern making device are then placed along the reference line marked on the surface from which the contour is to be cut and the innermost extension of the pins is marked in a conventional manner.

The planar surface is then cut around the pattern that has been transferred from the pattern making device to the surface to be cut.

BRIEF DESCRIPTION OF THE DRAWINGS

FIG. 1 is a reduced perspective view of the pattern making device of the present invention in the unlatched position.

FIG. 2 is a reduced plan view of the pattern making device of FIG. 1 in a latched position.

FIG. 3 is an enlarged section view of one of the pins located adjacent to the hinged end of one of the arms of the pattern making device of FIG. 1.

FIG. 4 is an enlarged section view similar to FIG. 3 of one pin of the pattern making device located adjacent to the hinged end of the arm opposite that of FIG. 3.

FIG. 5 is an enlarged fragmentary elevation view of the ends of the arms of the pattern making device latched together.

FIG. 6 is an enlarged fragmentary plan view of the hinge and ends of the arms adjacent the hinge of the pattern making device.

FIG. 7 is a reduced fragmentary perspective view of the ends of the arms of the pattern making device in the open or unlatched position.

FIG. 8 is a schematic view of the pattern making device supported in latched position around the concrete column.

FIG. 9 is a schematic view of the pattern making device in a latched position on a planar surface of an object from which a contour is to be cut.

FIG. 10 is a plan view of an alternative embodiment of a pattern making device for use in making patterns of square geometric figures.

DESCRIPTION OF THE PREFERRED EMBODIMENTS

Referring now to FIG. 1 a pattern making device 20 for use in retaining indications of the contours of a circular concrete column 21 or other object of geometric cross section at a specific level and at a defined plane is disclosed. The retained indication is transferred to a planar surface 22 of an object (FIG. 9) from which a cutout pattern 23 is made which contours the column 21 at the desired level and in the desired plane.

A plurality of incrementally spaced pins 24 are mounted to a pair of opposed semi-circular hooked arms 25, defining an outer boundary, as best seen in FIGS. 1 and 2. At one end 26, the arms 25 are connected by a cantilevered scissor hinge 27 which has a pivot point 28 exteriorly displaced from the ends of both arms 25. The scissor hinge 27 may be mounted to the arms on mounting blocks 29 adapted to raise the hinge 27 above a position where it might interfere with the pins 24 or the movement of the arms 25 away from each other, as seen in FIG. 6.

At a second end 30 of arms 25 opposite the end 26 is located on one arm a latch 31 which selectively engages a catch 32 on the other arm 25. The latch 31 and catch 32 are also mounted on mounting blocks 29 to raise the mechanism above the motion of the pins 24 as seen in FIGS. 5 and 7. An alignment pin 39 extends away from one end 30 to be received by an alignment hole 40 at the other end 30.

A plurality of bores 33 are formed through the radial width of both arms 25 along radii of the circle 34 defined when the arms 25 are closed, as best seen in FIGS. 2 and 5. The bores 33 are further adapted to receive the pins 24 in a reciprocating manner. The bore 33 and their respective pins 24 are so sized that the pins are maintained at any given position by friction between the pin and the bore that contains it.

All of the pins 24 are incrementally spaced about the perimeter of the hooked arms 25 at preferably equal arcuate segments around the circumference thereof. The pins are all of identical construction except for pins numbered 35 and 36, shown in FIGS. 3 and 4. Pins adjacent to the end 26, the location of pins 35 and 36, hit each other upon opening of the pattern making device 20 and destroy the pattern defined by those pins, if some steps are not taken. Alternately notching, so that the pins 35 and 36 can slide by each other as the arms 25 swing open (FIG. 1), has been found to allow pin 35 to pass pin 36 without any interference.

In an alternative embodiment, pins 35a and 36a (FIGS. 3 and 4) are relatively short compared to the balance of the pins 24. The arms 25 can pivot about the scissor hinge 27 to a much greater extent with the shorter pins 35a and 36a than the arms could if the pins 35 and 36 were of the same length as the pins 24.

The pins at the hinged end 26 hitting one another upon opening is further alleviated by the scissor hinge 27 being cantilevered away from the adjacent arms 25 so that the pivot point 28 is removed from the arms themselves. In this manner interference between adjacent pins is minimized by the fact that the arms 25 translate away from each other, as well as pivot about the removed scissor hinge 27.

The method for using the present invention is best adapted to retaining the indication of a pattern of the circular concrete column 21, or columns of other geometric cross section, shown in FIG. 8. Concrete columns 21 are widely used in the construction of large buildings and parking garages. Architectural plans specify that the column be of a preselected diameter. However, this optimum diameter is very seldom obtained when the concrete is actually poured. Variations in moisture content and the column's own weight tend to cause the column to set in an irregular manner.

In the type of construction to which the pattern making device 20 is most readily suited, many columns 21 are poured. These columns in turn support a concrete floor, not shown, which is poured around the column after the column has been poured. In order to support the concrete floor a planar wooden support surface 22 must be constructed around the uppermost end 37 of the concrete column. This surface 22, which is usually of wood like plywood, must have the cutout pattern 23 as nearly as possible match the contour of the surface of the column at the level at which the surface 22 will be supported along the column. It will be understood that many plywood surfaces 22 must be supported to pour the floor. The end result will be a checkerboard pattern (not shown), some of the squares, or plywood surfaces 22, having cutout patterns 23 through which the uppermost end 37 of the column 21 protrudes.

The invention is best utilized as shown in FIG. 8 and 9. Appropriate support structure or scaffolding 38 is placed around the column 21 or a number of columns, to ultimately support the checkerboard pattern of many plywood surfaces 22. As has been described, the surface 22 will ultimately support a concrete floor as it is poured around the existing column 21, as seen in FIG. 8.

The pattern making device 20 is first placed around the column 21 which is to be patterned at the level where support surface 22 will ultimately be positioned. The arms 25 of the pattern making device 20 are closed and latch 31 engages catch 32. The end 30 is aligned by the alignment pin 39 which extends away from one end 30 and is received by the alignment hole 40 on the opposite end 30.

While the pattern making device 20 is resting on the scaffolding 38, at the desirable level and normally in a horizontal plane, the pins 24 are slid inwardly toward the column 21 until the surface is contacted.

A pair of index points 41 are located respectively at the meeting positions of the ends 26 and the ends 30 at the interior perimeter of the arms 25, when the arms are in the latched or closed position. Once the pattern making device 20 is properly aligned, latched and pins 24 extended, these index points 41 are transferred and marked directly on the column 21 or other object to be patterned.

The pattern making device 20 is then unlatched, retaining the indication of the contour of the column 21 at the preselected location in the pins 24.

The planar surface support surface 22 from which a cutout pattern 23 is to be made is then marked with a reference line 42. (FIG. 9) The reference line could be arbitrary or could be an actual measurement taken from an adjacent wooden surface 22 to the marked index points 41 on the column 21, which in turn is transferred to surface 22. Of course, when actual measurements are made it is the intention of the method of the present invention to allow a series of surfaces 22 to be supported by scaffolding 38 to form a continuous floor upon which concrete will be formed, in the checkerboard pattern previously mentioned.

The pattern making device 20 is then relatched and the hinge and latch ends 26 and 30 are aligned along the reference line 42. To form the continuous floor, a first measurement must be made to construct the reference line 42. The distance from the edge of the surface 22, which is parallel to an imaginary line connecting index points 41, is measured to each index point on column 21. This distance to index points 41 is transferred to surface 22 from which a cutout pattern 23 is to be made, and reference line 42 is drawn connecting the transferred index points 41.

A second measurement along the reference line 42 will be necessary in order to properly align the cutout pattern 23 on the surface 22, as shown in FIG. 9. This second measurement is simply the distance from the edge of surface 22 that is positioned perpendicular to the reference line 42 to the nearest index point 41 on the column 21. This measurement is transferred to the surface 21 from which the cutout pattern 23 will be made along reference line 42.

Once the pattern making device 20 has been properly aligned, a pencil or other marking device is used to trace the innermost extension of the pins 24. It should be noted that a rectangular cross section pin 24 as shown in FIG. 5, is perhaps preferable to a round or other pin shape for the reason that it is easier to trace along the edge of the rectangular cross section than it would be a circular cross section.

The locus of points drawn around the innermost ends of pins 24 results in the cutout pattern 23 which can than be sawn out of the surface 22. The surface 22 with the cutout pattern 23 is then placed over the column 21 supported at the proper level by the scaffolding 38.

While one embodiment of the invention has been shown and described, it is to be understood that certain changes and additions may be made by those skilled in the are not departing from the scope and spirit of the invention, which is to be defined solely by the appended claims.

What I claim is:

1. A pattern making device adapted to contour an object having a geometric cross section in a single plane, comprising in combination:
    a pair of opposed arms adapted to move between an open position and a closed position, said arms encompassing an area greater than the area of said geometric object when the arms are in the closed position;
    a hinge pivotally connecting one end of said arms together, said hinge pivoting about a pivot point exteriorly displaced from said arms;
    a plurality of pins of predetermined length reciprocably connected to both of said arms at incremental locations along the length of both of said arms;
    a mounting block, connected to the end of said arms, to support tne hinge at a raised position above said arms; and
    latching means located at a second end of said arms, said latching means to thereby releasably connect said arms in the closed position.

2. A pattern making device adapted to contour an object having a geometric cross section in a single plane, comprising in combination:
    a pair of opposed arms adapted to move between an open position and a closed position, said arms encompassing an area greater than the area of said geometric object when the arms are in the closed position;
    a hinge pivotally connecting one end of said arms together, said hinge pivoting about a pivot point exteriorly displaced from said arms;
    a plurality of pins of predetermined length reciprocably connected to both of said arms at incremental locations along the length of both of said arms; and
    a first pin of said plurality of pins located on each of said opposed arms, said first pin located immediately adjacent to the pivotally connected one end of said arms, each of said first pins being relatively short in comparison to the plurality of pins.

3. A pattern making device adapted to contour an object having a geometric cross section in a single plane, comprising in combination:
    a pair of opposed arms adapted to move between an open position and a closed position, said arms encompassing an area greater than the area of said geometric object when the arms are in the closed position;
    a hinge pivotally connecting one end of said arms together, said hinge pivoting about a pivot point exteriorly displaced from said arms;
    a plurality of pins of predetermined length reciprocably connected to both of said arms at incremental locations along the length of both of said arms;
    a pair of first pins of said plurality of pins reciprocably connected to each of said arms, said first pins located respectively immediately adjacent to the pivotally connected one end of each arm, one of said first pins having an upwardly facing notch and the other first pin having a downwardly facing notch; and
    latching means located at a second end of said arms, said latching means to thereby releasably connect said arms in the closed position.

* * * * *